Patented Sept. 20, 1932

1,878,530

UNITED STATES PATENT OFFICE

LUCAS P. KYRIDES, OF BUFFALO, NEW YORK, ASSIGNOR TO NATIONAL ANILINE & CHEMICAL COMPANY, INC., OF NEW YORK, N. Y., A CORPORATION OF NEW YORK

PRODUCTION OF MALACHITE GREEN

No Drawing.  Application filed December 1, 1928. Serial No. 323,188.

This invention relates to the production of malachite green and includes the production of this dyestuff in the form of a powder by a process which omits certain steps heretofore thought to be essential. This invention further involves a new method of producing the color base of malachite green whereby the troublesome and expensive methods of purification heretofore practiced are eliminated.

Malachite green (colour Index No. 657) is usually prepared by condensing dimethylaniline with benzaldehyde in the presence of an acid, and oxidizing the leuco base, thus formed, to the color base or carbinol by means of lead peroxide and acetic acid. The lead is then removed from the oxidation solution as the sulfate by treating the solution with sodium sulfate and filtering off the precipitate. The color base is then obtained from the filtrate, wherein it is present as the acetate, by various well-known methods. The color base is usually converted, after removal from the filtrate, into its readily soluble acid salt, which is known in commerce as malachite green.

One method heretofore frequently used to obtain the color base from the filtrate is to treat the filtrate with dilute caustic soda or aqueous ammonia in excess to precipitate the color base out of solution as the carbinol. As thus obtained, the color base often contains tarry impurities in variable amounts which are precipitated along with the color base and which, when the color is subsequently dissolved in the dyebath, form an objectionable bronzy film on the surface of the bath. It is therefore desirable, and in many cases necessary, that these impurities be removed.

One method which has been heretofore proposed for removing these impurities, is to extract the color base with a solvent such as toluol or benzene, and steam distill off the solvent, leaving the color base in a purified state. The purified color base is then dissolved in a strong aqueous solution of oxalic acid, from which solution the dyestuff is obtained in the form of its oxalic acid salt by crystallization. To obtain the dyestuff as a powder, it has heretofore been the practice to pulverize or grind the dyestuff crystals thus produced. This method of purification has the disadvantage that it is troublesome, and is expensive because of the labor involved and the incidental loss of solvent. The step of crystallization is also expensive because it is slow and requires storage equipment to accommodate the liquors during crystallization.

If the purification of the crude color base by crystallization from a solvent is omitted it has heretofore been the practice to dissolve the color base in a strong aqueous solution of oxalic acid. The objectionable impurities are not thus removed, but are carried into solution. It is therefore necessary, in order to obtain pure crystals of malachite green, to subject this solution to fractional crystallization. Since the mother liquor remaining after crystallization contains large quantities of the dyestuff it is not discarded but is reworked to secure the maximum yield of dyestuff, a troublesome and expensive procedure.

Accordingly, one object of this invention is to obtain the oxalic acid salt of the color base without having to resort to crystallization of the same from an aqueous solution. Another object of the invention is the production of the color base in such purity that the step of extraction with a solvent for purification may be avoided, and so that when the carbinol is dissolved in an oxalic acid solution, it will not be necessary to resort to fractional crystallization to obtain the oxalic acid salt of the color base sufficiently pure. Another object of the invention is to obtain the salts of the color base by evaporating to dryness a solution of the salt of the color base. Still another object is to precipitate the carbinol from the filtrate, sufficiently free from the objectionable impurities usually present therein. These and other objects will be readily apparent from a consideration of the following description wherein is explained and illustrated a preferred manner of practicing the invention.

It has been found, according to the present invention, that where the color base is obtained in sufficient purity, it is unnecessary to resort to crystallization to obtain the same as its oxalic acid salt, but that the oxalic acid salt can be obtained by evaporating an aqueous oxalic acid solution of the color base to dryness. It has also been observed that objectionable tarry impurities which are present in the solution after oxidation of the leuco base to the color base are precipitated upon the addition of a small quantity of caustic alkali before any great portion of the color base is precipitated. In order to remove these tarry impurities from the solution formed after oxidation of the leuco base to the color base, it is necessary only to add to the solution a small amount of caustic alkali liquor, sufficient to cause the precipitation of only a small amount of the color base, for example, about 2 to 3%. This treatment results in the precipitation of the impurities along with the small portion of the color base, while the remainder of the color base stays in solution. The resulting precipitate is then filtered off and the color base is precipitated out of solution from the filtrate by addition of an excess of alkali. The carbinol thus obtained can then be converted into its oxalate. The above described process of purification by extraction with a solvent can therefore be eliminated and the carbinol can be obtained in such purity that it becomes unnecessary to resort to crystallization to obtain the malachite green.

The following specific example is given by way of illustration of the invention. The parts are by weight.

*Example.*—1105 parts of the leuco base of malachite green (obtained by condensation of benzaldehyde with dimethylaniline) is oxidized by means of lead peroxide in the manner well known to the art (Heumann-Die Anilinfarben, Vol. I, p. 46). Sodium sulfate solution is then added in sufficient quantity to precipitate the lead in the form of its sulfate.

Sufficient caustic soda liquor of about 47% strength is added with agitation to precipitate only about 2 to 3% of the color base. The caustic soda thus added causes the precipitation of impurities. Agitation is continued for several hours after which the insoluble matter comprising lead sulfate, a small portion of the color base (about 2 to 3%), and impurities is filtered off and washed. The main portion of the color base, which is contained in the filtrate, is now precipitated therefrom in the form of the carbinol by addition of sufficient sodium bicarbonate to the filtrate. The carbinol is then filtered off and washed.

To convert the carbinol into its oxalic acid salt, it is dissolved in about 3 parts of water per part of carbinol, and the theoretically correct amount (1.5 mols oxalic acid per mol of carbinol) of oxalic acid as determined by analysis and warmed to about 60° C. until all goes into solution. The solution is now evaporated to dryness in copper pans and preferably in vacuo, to secure the dyestuff as its oxalate. The dry cake thus obtained is then powdered.

The procedure is not limited by the details recited in the above example. If desired, the preliminary precipitation with caustic soda may be omitted, in which case the lead sulfate is substantially completely filtered off and the color base is substantially completely precipitated as the carbinol from the filtrate by addition of alkali. The carbinol thus obtained, may be purified by any known method, as by extraction with a solvent, after which it is taken up with water and the theoretically correct amount of oxalic acid, and the solution formed is evaporated to dryness.

When the preliminary precipitation with caustic alkali is used, the addition of the caustic soda for this purpose may take place before or after filtering off the lead sulfate. Sodium carbonate may be used for this purpose, but caustic alkali is preferred. The color base may be precipitated by caustic soda or any other alkali from the filtrate after the impurities are removed, although sodium bicarbonate is preferred. The quantity of alkali employed for precipitation of the impurities may be varied within wide limits, depending on conditions of operation. In general, it will be found that the addition of sufficient alkali to precipitate about 2 to 3 per cent of the color base will be sufficient to substantially eliminate the objectionable impurities. Obviously, a greater quantity of alkali may be employed, if desired, although an increased loss of color results thereby. The use of a smaller quantity of alkali may result in the production of less impure color. The quantity of alkali to be employed in a particular case may readily be determined by analysis of the solution of the color base, or in any other convenient manner.

By the term "alkali" it is intended to include the carbonates or bicarbonates, as well as the hydroxides of the alkali metals and ammonia.

It is obvious that the quantity of dyestuff brought down in the preliminary precipitation step may be varied within wide limits, depending on the amount of impurities originally present in the solution, and on factors of operation.

I claim:

1. In the process of producing malachite green, the step comprising evaporating to substantial dryness a solution containing oxalic acid and substantially the pure color base of malachite green in about the proportion of 3 mols oxalic acid to 2 mols color base 2. In the production of malachite green by a process comprising condensing benzaldehyde with dimethylaniline, oxidizing the resulting leuco base in aqueous solution with lead peroxide to form the color base, and precipitating lead out of the solution, the improvement which comprises adding caustic soda to the solution in an amount sufficient to precipitate impurities and only a small quantity of the color base, filtering off insoluble matter, and precipitating the color base from the filtrate by the addition thereto of an alkali.

3. In the process wherein benzaldehyde is condensed with dimethylaniline to form a leuco base of malachite green, which product is oxidized in aqueous solution with lead peroxide and an acid to form the color base, which color base is precipitated out of the oxidation solution, the improvement which comprises carrying out the precipitation by first adding caustic soda to the solution in an amount sufficient to precipitate impurities and only about 2 to 3% of the color base, filtering off insoluble matter, and precipitating the color base from the filtrate by the addition thereto of sodium bicarbonate.

4. In the production of malachite green by a process comprising condensing benzaldehyde with dimethylaniline, oxidizing in aqueous solution by means of lead peroxide the leuco base thus produced to the color base, and precipitating the lead out of solution, the improvement which comprises adding caustic soda to the solution in an amount sufficient to precipitate impurities and only about 2 to 3% of the color base, filtering off insoluble matter, and precipitating the color base from the filtrate by the addition thereto of an alkali.

5. In the production of malachite green by a process comprising condensing benzaldehyde with dimethylaniline, oxidizing in aqueous solution by means of lead peroxide the leuco base thus produced to the color base, precipitating the lead out of solution and filtering off the precipitate, the improvement which comprises adding caustic soda to the remaining solution in an amount sufficient to precipitate impurities and only about 2 to 3% of the color base, filtering off insoluble matter, precipitating the color base from the filtrate by the addition thereto of an alkali, dissolving the carbinol in an aqueous solution of oxalic acid, and evaporating the resulting solution to substantial dryness.

6. In the production of malachite green by a process which comprise oxidizing the leuco base in aqueous solution to the color base, the improvement which comprises adding alkali to the solution in an amount sufficient to precipitate impurities and only a small quantity of the color base, filtering off insoluble matter, and precipitating the color base from the filtrate by addition thereto of an alkali.

7. In the production of malachite green, the process which comprises dissolving the substantially pure color base of malachite green and oxalic acid in water and evaporating the resulting solution to substantial dryness.

8. In the production of a dyestuff, the step which comprises dissolving substantially pure tetramethyldiaminotriphenylcarbinol and its stoichiometrical proportion of oxalic acid in water and evaporating to substantial dryness the resulting solution.

9. In the production of malachite green by condensing benzaldehyde with dimethylaniline, and oxidizing in aqueous solution the leuco base thus produced to the color base, the improvement which comprises adding caustic soda to the solution of the color base in an amount sufficient to precipitate impurities and only a small quantity of the color base, filtering off insoluble matter from the resulting liquor, and precipitating the color base from the filtrate by the addition thereto of an alkali.

10. In the production of malachite green, the improvement which comprises adding caustic soda to a solution of the color base of malachite green containing impurities in an amount sufficient to precipitate impurities and only a small quantity of the color base, separating insoluble matter, and precipitating the color base from the mother liquor by the addition thereto of an alkali.

11. In the production of malachite green, the improvement which comprises adding alkali to a solution of the color base of malachite green containing impurities in an amount sufficient to precipitate impurities and only a small quantity of the color base, separating insoluble matter, and precipitating the color base from the mother liquor by the addition thereto of an alkali.

12. In the production of malachite green, the improvement which comprises adding alkali to a solution of the color base of malachite green containing impurities in an amount sufficient to precipitate impurities and only a small quantity of the color base, separating insoluble matter, and precipitating the color base from the mother liquor by the addition thereto of sodium bicarbonate.

13. In the production of malachite green by a process which comprises oxidizing the leuco base in aqueous solution to the crude color base, whereby a solution containing the color base and impurities is obtained, the improvement which comprises precipitating impurities and only a small amount of the color base from the solution by an alkali, and separating the precipitate from the remaining solution of the color base.

14. In the production of malachite green by a process which comprises condensing benzaldehyde with dimethyl-aniline, oxidizing in aqueous solution by means of lead peroxide the leuco base thus produced to the color base, and precipitating the lead out of solution, whereby a solution containing the color base and impurities is obtained, the improvement which comprises treating the solution with an amount of caustic soda sufficient to precipitate impurities and only a small amount of the color base, and separating the precipitate from the remaining solution of the color base.

15. In the production of malachite green by a process which comprises condensing benzaldehyde with dimethyl-aniline, oxidizing in aqueous solution by means of lead peroxide the leuco base thus produced to the color base, and precipitating the lead out of solution, whereby a solution containing the color base and impurities is obtained, the improvement which comprises treating the solution with an amount of caustic soda sufficient to precipitate impurities and only a small amount of the color base, and separating the precipitate from the remaining solution of the color base.

In testimony whereof I affix my signature.

LUCAS P. KYRIDES.